US012282465B1

(12) United States Patent
Thunuguntla et al.

(10) Patent No.: US 12,282,465 B1
(45) Date of Patent: Apr. 22, 2025

(54) INTELLIGENT DATA REPAIR FOR MOVING SOURCE

(71) Applicant: Intuit Inc., Mountain View, CA (US)

(72) Inventors: Saikiran Sri Thunuguntla, Bangalore (IN); Vishal Reddy Baddam, Bangalore (IN); Pradeep Srinivas Krishna, Bangalore (IN); Thatchinamoorthy Kallipatti Arumugam, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/775,077

(22) Filed: Jul. 17, 2024

(51) Int. Cl.
*G06F 16/20* (2019.01)
*G06F 16/215* (2019.01)
*G06F 16/23* (2019.01)
*G06F 16/2458* (2019.01)
G06F 16/18 (2019.01)
G06F 16/21 (2019.01)
G06F 16/25 (2019.01)

(52) U.S. Cl.
CPC ........ *G06F 16/215* (2019.01); *G06F 16/2379* (2019.01); *G06F 16/2477* (2019.01); *G06F 16/1873* (2019.01); *G06F 16/214* (2019.01); *G06F 16/219* (2019.01); *G06F 16/2358* (2019.01); *G06F 16/254* (2019.01); *G06F 2211/1035* (2013.01)

(58) Field of Classification Search
CPC .. G06F 16/1873; G06F 16/214; G06F 16/215; G06F 16/219; G06F 16/2358; G06F 16/2379; G06F 16/2477; G06F 16/254; G06F 2211/1035
See application file for complete search history.

(56) References Cited

U.S. PATENT DOCUMENTS

2011/0213923 A1* 9/2011 Ledford .............. G06F 12/0868 711/E12.019
2012/0210189 A1* 8/2012 Sugihara ............ H03M 13/1182 714/752

FOREIGN PATENT DOCUMENTS

CN         116069864 A  *  5/2023

OTHER PUBLICATIONS

CN 116069864 A (English Translation) (Year: 2023).*

* cited by examiner

*Primary Examiner* — Diedra McQuitery
(74) *Attorney, Agent, or Firm* — Paradice & Li LLP

(57) ABSTRACT

Systems and methods for intelligently repairing data are disclosed. An example method is performed by one or more processors of a data quality management (DQM) system and includes receiving a transmission over a communications network from a computing device associated with the DQM system, the transmission including an indication that source data stored in a source database was ingested and stored as target data in a target database at a time of ingestion, comparing, using an advanced DQM algorithm, the target data with the source data, the advanced DQM algorithm including generating a first set of parity results based on changes occurring before the time of ingestion, generating a second set of parity results based on changes occurring after the time of ingestion, and generating differential results based on the first and the second set of parity results, and selectively repairing ones of the changes based on the differential results.

20 Claims, 3 Drawing Sheets

INTELLIGENT DATA REPAIR FOR MOVING SOURCE

TECHNICAL FIELD

This disclosure relates generally to intelligent data repair, and specifically to using a data quality management (DQM) system in conjunction with an advanced DQM algorithm to selectively repair changes to data.

DESCRIPTION OF RELATED ART

As organizations have increasingly relied on the accuracy of their data, quality assurance and data management have become increasingly important. For example, artificial intelligence (AI)-driven platforms aim to enable their experts to generate meaningful insights and decisions, and the quality of their insights and decisions depends greatly on the integrity of their datasets.

However, managing the accuracy of data becomes even more challenging when dynamic or ("moving") data sources are involved, such as news feeds, social media, sensor networks, and transaction events. During replication procedures that copy such data to centralized repositories for analytical use (e.g., DataLakes), the constantly changing transactional source data frequently results in errors and inconsistencies, such as incorrect values, missing information, duplicates, or format discrepancies ("data issues"). Such data issues often require identification and correction, e.g., via various parity procedures. However, some errors and inconsistencies may self-resolve over time (i.e., become "eventually consistent"), such as when multiple data streams and systems are updating asynchronously. Although such inconsistencies may at first appear as problems, they may automatically resolve during an upcoming update procedure. Conventional Data Quality Management (DQM) systems cannot reliably distinguish between "genuine" data issues and "eventually consistent" data issues, resulting in unnecessary corrections that waste processing resources and ironically risk the integrity of the data.

Without a reliable method for making these distinctions, efforts to correct perceived inaccuracies (e.g., in the DataLake) will continue to result in fixing non-issues, computer and human inefficiencies, and data corruption. What is needed is a system that can intelligently recognize that some data will align with source data in subsequent updates.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for intelligently repairing data. An example method is performed by one or more processors of a data quality management (DQM) system and includes receiving a transmission over a communications network from a computing device associated with the DQM system, the transmission including an indication that source data stored in one or more source databases was ingested and stored as target data in one or more target databases at a time of ingestion, comparing, using an advanced DQM algorithm, the target data with the source data, the advanced DQM algorithm including generating a first set of parity results based on changes occurring before the time of ingestion, generating a second set of parity results based on changes occurring after the time of ingestion, and generating differential results based on the first set of parity results and the second set of parity results, and selectively repairing ones of the changes based on the differential results.

Another innovative aspect of the subject matter described in this disclosure can be implemented in a system for intelligently repairing data. An example system includes one or more processors and a memory storing instructions for execution by the one or more processors. Execution of the instructions causes the system to perform operations including receiving a transmission over a communications network from a computing device associated with the system, the transmission including an indication that source data stored in one or more source databases was ingested and stored as target data in one or more target databases at a time of ingestion, comparing, using an advanced DQM algorithm, the target data with the source data, the advanced DQM algorithm including generating a first set of parity results based on changes occurring before the time of ingestion, generating a second set of parity results based on changes occurring after the time of ingestion, and generating differential results based on the first set of parity results and the second set of parity results, and selectively repairing ones of the changes based on the differential results.

Another innovative aspect of the subject matter described in this disclosure can be implemented as a non-transitory computer-readable medium storing instructions that, when executed by one or more processors of a system for intelligently repairing data, cause the system to perform operations. Example operations include receiving a transmission over a communications network from a computing device associated with the system, the transmission including an indication that source data stored in one or more source databases was ingested and stored as target data in one or more target databases at a time of ingestion, comparing, using an advanced DQM algorithm, the target data with the source data, the advanced DQM algorithm including generating a first set of parity results based on changes occurring before the time of ingestion, generating a second set of parity results based on changes occurring after the time of ingestion, and generating differential results based on the first set of parity results and the second set of parity results, and selectively repairing ones of the changes based on the differential results.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
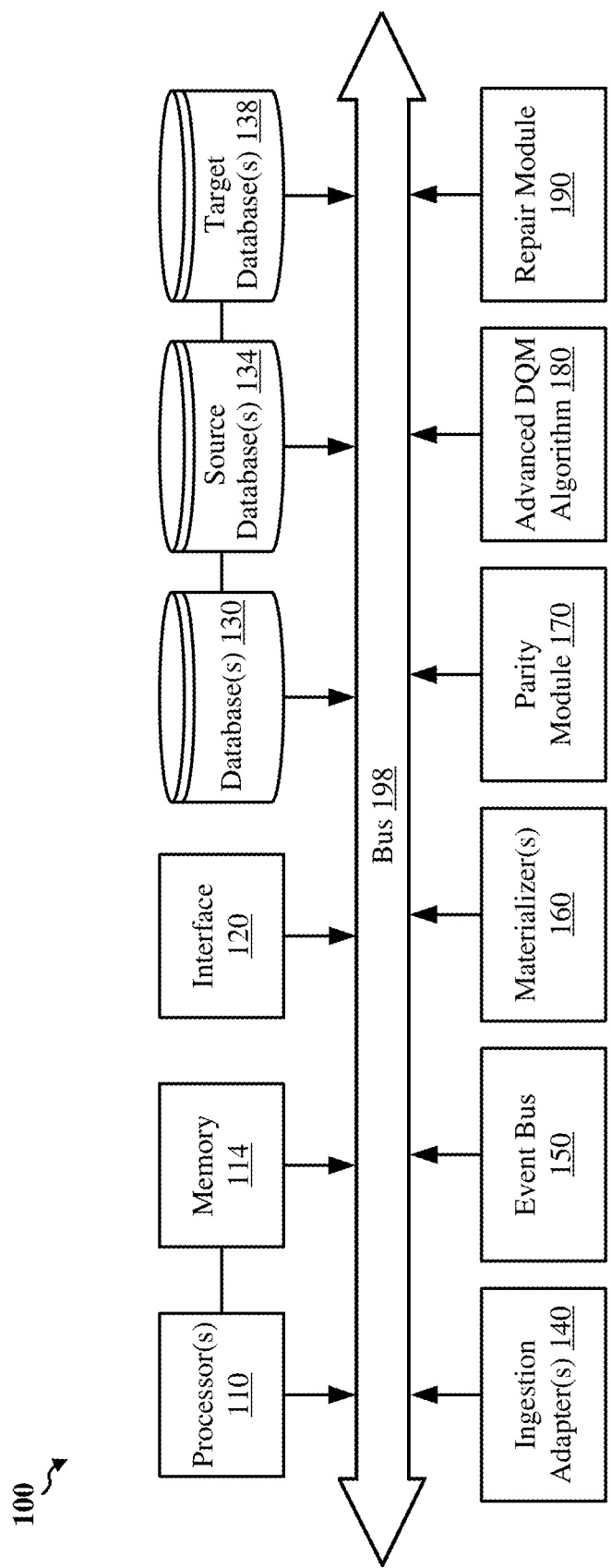
FIG. 1 shows a system, according to some implementations.

As described above, organizations have increasingly relied on the accuracy of their data, particularly for AI-driven platforms where the integrity of datasets is directly related to the quality of the insights and decisions that experts generate using the data. Dynamic (or "moving") data sources (e.g., news feeds, social media, etc.) increase the challenge of maintaining accurate data due to frequent errors and inconsistencies that arise during data replication procedures, such as procedures that copy the source data to a centralized repository like a DataLake. As conventional Data Quality Management (DQM) systems cannot reliably differentiate between genuine data issues ("error" scenarios) and instances where the data will self-resolve over time ("eventually consistent" scenarios), conventional DQM systems are notorious for inefficiently, repeatedly, and potentially hazardously correcting data that does not need to be corrected. What is needed is a system capable of intelligently recognizing true data sync "error" scenarios and responding appropriately, such as by proactively refraining from making redundant and potentially harmful corrections in "eventually consistent" scenarios where the data may initially appear inconsistent, and rather, intelligently inferring that the data will become consistent over time.

For purposes of discussion herein, source data may be stored in source databases that are used for storing data related to various services offered by an organization (e.g., social media, financial management, expert analysis, etc.). The source databases may operate as Online Transaction Processing (OLTP) databases and may constantly be subjected to operations such as inserts, updates, and deletes that are recorded in binary (or "bin") logs. While the source databases are effective for supporting basic user interactions (e.g., in mobile and web platforms), they are not optimized for the analytical purposes of data experts. Thus, various adapters (e.g., ingestion adapters) may extract data from the bin logs, incorporate the extracted data into various event buses (e.g., Kafka-like systems), and perform one or more materialization processes that replicate the source data in one or more target databases (e.g., DataLakes) for expert analytical use. Non-limiting examples of expert analytical use include data queries for purposes of trend analysis to uncover patterns and correlations over time, user and/or customer segmentation for identifying valuable groups based on behavioral and demographic data, predictive analytics for forecasting future trends and behaviors, sentiment analysis to assess user and/or customer attitudes and feedback, and the like. The process of transitioning the source data from its original form in the source databases to its replicated form in the target databases may be referred to as an ingestion process, a materialization process, a merge process, or the like.

Once the ingestion process is complete, discrepancies in the data stored in the target databases (e.g., DataLake) are detected, such as based on one or more parity operations. The innovative DQM system described herein can identify which data discrepancies represent "genuine error" data issues (such as missing values or incorrect entries resulting from hardware failures, software bugs, environmental factors, and the like) and immediately address the data issues (e.g., repair them in the DataLake) before various downstream processes are performed, such as to prevent compromised results or decision-making. In addition, the innovative DQM system described herein can identify which data inaccuracies represent "eventually consistent" data issues and allow such issues to indeed become eventually consistent rather than unnecessarily (and potentially repeatedly) correcting such issues.

The DQM system described herein incorporates an innovative algorithm that analyzes multiple parity results (e.g., with different parity runtime slots) to intelligently identify and initiate the repair (or non-repair) of data discrepancies that are identified during and/or after the data ingestion process. That is, unlike conventional data repair techniques, the system described herein deterministically identifies whether data discrepancies are true data errors and can initiate their repair or non-repair as appropriate. In addition, the techniques described herein enable genuine data issues to be identified immediately, and thus, delays that are typically associated with waiting for subsequent data sync (e.g., materializer) processes to finish can be eliminated. Such proactive detection prevents true data problems from escalating and ensures that end users have access to reliable data with minimum interruption.

Various implementations of the subject matter disclosed herein provide one or more technical solutions to the technical problem of improving the functionality (e.g., speed, accuracy, etc.) of computer-based systems, where the one or more technical solutions can be practically and practicably applied to improve on existing techniques for repairing data. Implementations of the subject matter disclosed herein provide specific inventive steps describing how desired results are achieved and realize meaningful and significant improvements on existing computer functionality—that is, the performance of computer-based systems operating in the evolving technological field of data repair.

FIG. 1 shows a system 100, according to some implementations. Various aspects of the system 100 disclosed herein are generally applicable for intelligently repairing data. The system 100 includes a combination of one or more processors 110, a memory 114 coupled to the one or more processors 110, an interface 120, one or more databases 130, a source database 134, a target database 138, an ingestion adapter 140, an event bus 150, a materializer 160, a parity module 170, an advanced DQM algorithm 180, and/or a repair module 190. In some implementations, the various components of the system 100 are interconnected by at least a data bus 198. In some other implementations, the various components of the system 100 are interconnected using other suitable signal routing resources.

The processor 110 includes one or more suitable processors capable of executing scripts or instructions of one or more software programs stored in the system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more graphics processing units (GPUs) and/or tensor processing units (TPUs), such as for processing a large amount of data.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

The interface 120 is one or more input/output (I/O) interfaces for transmitting or receiving (e.g., over a communications network) transmissions, input data, and/or instructions to or from a computing device (e.g., of a user), outputting data (e.g., over the communications network) to the computing device of the user, providing a search and/or querying interface for the user, outputting search and/or query results to the computing device of the user, and the like. In some implementations, the interface 120 is used to initiate any one or more of an ingestion process, a materialization process, a replication and/or merging process, a parity process, a repair process, and the like. The interface 120 may also be used to provide or receive other suitable information, such as computer code for updating one or more programs stored on the system 100, internet protocol requests and results, or the like. An example interface includes a wired interface or wireless interface to the internet or other means to communicably couple with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the system 100 by a local user or moderator.

The database 130 stores data associated with the system 100, such as source data, target data, indications, timestamps, events, parity results, algorithms, differential results, ambiguities, intersection results, repair values, data objects, algorithms, weights, models, modules, engines, user information, other values, ratios, historical data, recent data, current or real-time data, files, plugins, metadata, arrays, tags, identifiers, prompts, queries, replies, feedback, insights, formats, characteristics, and/or features, among other suitable information, such as in one or more JavaScript Object Notation (JSON) files, comma-separated values (CSV) files, or other data objects for processing by the system 100, one or more Structured Query Language (SQL) compliant data sets for filtering, querying, and sorting by the system 100 (e.g., the processor 110), or any other suitable format. In various implementations, the database 130 is a part of or separate from the source database 134, the target database 138, and/or another suitable physical or cloud-based data store. In some implementations, the database 130 includes a relational database capable of presenting information as data sets in tabular form and capable of manipulating the data sets using relational operators.

The one or more source databases 134 store data associated with source data, such as the source data itself, or any other suitable data related to the source data. In some implementations, the source database 134 includes one or more databases that can efficiently handle high-volume, short transactions, including data insertion, updating, and querying, and ensure data integrity and consistency across multi-user environments. In some implementations, the source database 134 includes one or more Online Transaction Processing (OLTP) databases. Example OLTP sources include MySQL, Oracle, Postgres, SQL Server, DynamoDB, S3 Files, SFTP, Domain Events, IPS, Outbox Service, or any other suitable database that can be used for managing high-volume transactions, providing advanced security features, supporting complex queries, enabling data access, securing data transfer, and the like. In various implementations, the source database 134 may be a part of or separate from the database 130 and/or the target database 138. In some instances, the source database 134 includes data stored in one or more cloud object storage services, such as one or more Amazon Web Services (AWS)-based Simple Storage Service (S3) buckets. In some implementations, all or a portion of the data is stored in a memory separate from the source database 134, such as in the database 130 and/or another suitable data store.

The one or more target (or "destination") databases 138 store data associated with target (or "destination") data, such as the target data itself, or any other suitable data related to the target data. In some implementations, the target database 138 includes one or more databases that are ideal for storing vast amounts of historical data that may be used in performing various analytics. For instance, the analytics may include the execution of complex statistical analytical queries submitted by AI expert data analysts. In some implementations, the target database 138 includes one or more DataLakes. To enable fast data retrieval and effective expert analysis of large datasets, the data replicated from the source databases is represented in the DataLake in a columnar format structure. In various implementations, the target database 138 may be a part of or separate from the database 130 and/or the source database 134. In some instances, the target database 138 includes data stored in one or more cloud object storage services, such as one or more Amazon Web Services (AWS)-based Simple Storage Service (S3) buckets. In some implementations, all or a portion of the data is stored in a memory separate from the target database 138, such as in the database 130 and/or another suitable data store.

The process of transitioning the source data from its original form in the source databases 134 to its replicated form in the target databases 138 may be referred to as an ingestion process, a materialization process, a merge process, or the like. For purposes of discussion herein, the components involved in performing the ingestion process may collectively be referred to as a Unified Ingestion Platform (UIP), a data movement platform, a data integration platform, an ingestion platform, a data replication platform, or the like. The ingestion process may include extracting the source data (e.g., thousands of tables or more) from the source database 134 using one or more adapters (e.g., the ingestion adapter 140), incorporating the data into one or more event buses (e.g., the event bus 150), and performing one or more materialization processes (e.g., using the materializer 160) that replicate the source data in the target database 138 (e.g., the DataLake). In some instances, the ingestion process is referred to as a bootstrap process, such as when a complete copy of the data from the source databases 134 is replicated on the target databases 138 (e.g., to establish a baseline dataset upon which subsequent updates can be applied). Following the bootstrap process, subsequent ingestion processes may continue periodically, which may be scheduled at predefined intervals (e.g., hourly, daily), thus ensuring that the target databases 138 remain up-to-date with the latest changes recorded in the source databases 134. By continuously integrating updates from the source databases 134, relevant data that can be used for analytical processing is maintained on the target databases 138.

In some implementations, the event bus 150 incorporates one or more aspects of change data capture (CDC) to facilitate real-time data integration from the OLTP source databases 134. Specifically, CDC events may be extracted based on the changes captured from the source database 134 and serialized into a (e.g., UIP) format that includes important information about the associated change, such as a timestamp associated with the change and data before and after the change. The events may be published to the event bus 150. Thereafter, the data may be transferred from the event bus 150 to one or more pipelines each including one or more materializers 160. In general, the materializer 160 retrieves updates and changes since a most recent materialization checkpoint to ensure that the target database 138 (e.g., the DataLake) is synchronized with a most recent state of the source data. One example data pipeline may be for real-time processing, where the data is transferred from the event bus 150 to a materializer 160 (e.g., a streaming materializer) and then to a particular target database 138, such as a clean DataLake that stores target data in delta tables (e.g., such as to allow immediate access with relatively high data integrity). Another example data pipeline may be for cost-effective large-scale analysis and historical reporting, where the data is batched from the event bus 150 to an object storage service (e.g., one or more Amazon S3 buckets), processed by a materializer 160 (e.g., a batch materializer), and stored in a raw DataLake (e.g., in parquet format in hive tables).

The parity module 170 may be used to receive a transmission over a communications network from a computing device associated with the DQM system. The transmission may include an indication that an ingestion process has completed—that is, that source data stored in the one or more source databases 134 was ingested (e.g., by the ingestion adapter 140, event bus 150, and materializer 160) and stored as target data in the one or more target databases 138. In some instances, the transmission is received from the target database 138, the materializer 160, or another suitable component for informing the parity module 170 that the ingestion process is complete. The indication may also include one or more times associated with the present (or most recent) ingestion process, such as a time that the ingestion process started, a duration of the ingestion process, a time that the ingestion process was completed, a scheduled time of a future ingestion process, a previous time of ingestion, and the like. For purposes of discussion herein, the "time of ingestion" may refer to the time that the present ingestion process started, which may also be referred to as a start time of the materializer 160. In some instances, the indication includes one or more times associated with multiple ingestion processes. For instance, as further described below, a "first" set of parity results may be generated based on changes occurring before the most recent time of ingestion (e.g., before T2) and after a previous time of ingestion (e.g., after T1), and a "second" set of parity results may be generated based on changes occurring after the most recent time of ingestion (e.g., after T2). The indication may also include information (such as timestamps) related to events or changes that occurred in association with the source data. In some instances, times of the changes are communicated using change data capture (CDC) timestamps.

The parity module 170 may also be used in conjunction with the advanced DQM algorithm 180 to compare the target data with the source data. For instance, differential results may be generated based on portions of multiple parity results with different parity runtimes, and the differential results may be used to identify data discrepancies and/or changes for selective repair (or non-repair). Specifically, upon receiving the indication that the ingestion process has completed, the parity module 170 may generate a first set of parity results based on changes occurring before the time of ingestion (e.g., and after a previous time of ingestion), and then the parity module 170 may generate a second set of parity results based on changes occurring after the time of ingestion (e.g., and up to the present moment). It will be understood that parity results refer to the results of a parity job or another suitable quality assurance process performed after the source data is ingested into the target database 138. For instance, the process may involve running queries on the original data source (e.g., the source database 134) and the destination database (e.g., the target database 138) and comparing the results (e.g., using a suitable diff algorithm and/or tool), where the objective is to identify discrepancies between the sets of data. In some aspects, the parity job adds parity bits to the source data to maintain an even or odd number of 1s, allowing for error detection by recalculating the parity on the target data, where a discrepancy between the original and recalculated parity indicates a parity error.

As a non-limiting example, an example table is stored in the source database 134 and the target database 138. For this example, T1 (10 am) represents the previous time of ingestion, and T2 (2 pm) represents the most recent (present) time of ingestion. In some instances, the ingestion process has a duration of 30-60 minutes (for example), after which, the first and second sets of parity results are generated. For ease of explanation, modifications (e.g., inserts, updates, and deletes) applied to rows identified by various primary keys (PKs) in a single example table in the source database 134 are discussed. To note, the modifications represent inserts, updates, and deletes to values in columns other than the PK value column for the example table. For instance, an example table may include an "id" column storing the PK values for the rows in the table, a "quantity" column storing quantities associated with the rows, and a "mode" column storing modes associated with the rows, and the modifications may change values associated with the "quantity" or "mode" columns and not the "id" column. The example modifications include: an insertion ("insert") at 10:30 am of [PK1] with an associated value of 1, an update ("update") at 1:30 pm associated with [PK1] changing the value to 2, and another update associated with [PK1] at 2:20 pm adjusting the value to 3; a deletion ("delete") associated with [PK2] at 11 am; a deletion associated with [PK3] at 12 pm; an update associated with [PK4] changing a value to 5 at 1 pm; an update associated with [PK5] adjusting a value to 6 at 1 pm; an insert of [PK6] with an associated value of 6 at 1:30 pm; an insert of [PK7] with an associated value of 7 at 1:30 pm; and an insert of [PK8] with an associated value of 8 at 2:30 pm. Thus, the present states in the source database 134 are as follows: [PK1] with an associated value of 3 at 2:20 pm, [PK4] with an associated value of 5 at 1 pm, [PK5] with an associated value of 6 at 1 pm, [PK6] with an associated value of 6 at 1:30 pm, [PK7] with an associated value of 7 at 1:30 pm, and [PK8] with an associated value of 8 at 2:30 pm. To note, the values associated with [PK2] and [PK3] were deleted (i.e., entirely removed) from the source database 134 prior to T2, and both the most recent update to [PK1] and the insert of [PK8] occurred after T2. In contrast to the present states in the source database 134, the latest values in the target database 138 (for this example) are as follows: [PK1] with an associated value of 2 at 1:30 pm (correct, but stale), [PK3] with an associated value of NULL at 12 pm (missed delete), [PK4] with an associated value of 5 at 1 pm (correct), [PK5] with an associated value of 5 at 1 pm (incorrect value), [PK6] with an associated value of 6 at 1:30 pm (correct), and [PK7] with an associated value of 7 at 1:30 pm (correct). [PK8] is not expected to appear on the target database 138 until the next ingestion process is run because [PK8] was inserted after T2.

Upon completing the parity jobs, the parity module 170 in conjunction with the advanced DQM algorithm 180 categorizes any discrepancies it finds into specific types. Specifically, at least each discrepancy included in the first and second sets of parity results is assigned one of a plurality of discrepancy types. A first example data discrepancy type indicates that an associated change was detected in the target database 138 but not in the source database 134, which may also be referred to as "Present in Target, missing in Source." For instance, a delete that occurred on the source database 134 but was missed (or has not yet propagated) on the target database 138 may be categorized as the first discrepancy type. A second example data discrepancy type indicates that an associated change was detected in the source database 134 and not the target database 138, which may also be referred to as "Present in Source, missing in Target." For instance, an insert or update that occurred on the source database 134 but was missed (or has not yet propagated) on the target database 138 may be categorized as the second discrepancy type. A third example data discrepancy type indicates that an associated change was detected in both locations but with mismatched values or attributes, which may also be referred to as "Present in both places, mismatch." For instance, deletes, inserts, or updates that occur on the source database 134 but are missed or incorrectly updated on the target database 138 may be categorized as the third discrepancy type.

In some implementations, additional or fewer discrepancy types may be used. For instance, in some implementations, the third example data discrepancy type may not be used. As further described below, the parity module 170 in conjunction with the advanced DQM algorithm 180 uses the discrepancy types in conjunction with the time-staggered parity results to differentiate between true, "genuine error" discrepancies (e.g., due to hardware failures, software bugs, environmental factors, and the like) and "eventually consistent" discrepancies that are expected to harmlessly resolve over time (e.g., during a subsequent ingestion process). In some other implementations not shown, upon generating the parity results, the parity module 170 may store the mismatched difference data in a cache (e.g., the database 130 or another suitable cache) until a subsequent ingestion process is complete. After the subsequent ingestion process completes, the parity module 170 may again generate parity results using the cached mismatched difference data and the present data. In some instances, ones of the mismatches will have been resolved. For mismatches that have yet to be resolved, the parity module 170 may again wait for a next subsequent ingestion process to complete before generating additional parity results.

Upon categorizing the discrepancies into the discrepancy types, the parity module 170 in conjunction with the advanced DQM algorithm 180 generates a set of ambiguities including ones of the first set of parity results assigned the first discrepancy type. That is, the set of ambiguities represents discrepancies associated with changes that occurred before the time of ingestion (e.g., before T2) that were flagged as data discrepancies due to data not being present on the source database 134 but being present on the target database 138 (i.e., the first discrepancy type).

Thus, for the non-limiting example above, the parity module 170 may generate the first set of parity results by submitting the following simplified example SQL-based queries: [Query 1] 'DL_Changes_1=Select*from DL_table where cdc_column>=T1 and cdc_column<=T2', which will retrieve all records from DL_table (on the target database 138) where the values in the cdc_column fall within a specified range (from T1 to T2), i.e., all inserts and updates on the target database 138 between times T1-T2; [Query 2] 'Source_Changes_1=Select*from Source_table where cdc_column>=T1 and cdc_column<=T2', which will retrieve all records from Source_table (on the source database 134) where the values in the cdc_column fall within the specified range (T1 to T2), i.e., all inserts and updates on the source database 134 between times T1-T2; and [Query 3] 'Compute {Source_Changes_1−DL_Changes_1}', which will return a difference between the results of Query 1 and Query 2, i.e., the first set of parity results. Thus, the parity module 170 may categorize the discrepancies identified from the first set of parity results as follows: [First Discrepancy Type] {[PK1], [PK3]}; [Second Discrepancy Type] {Empty}; and [Third Discrepancy Type]: {[PK5]}.

To note, for this example, the parity module 170 may determine that [PK2], [PK4], [PK6], and [PK7] are not discrepancies for the first set of parity results. For instance, [PK2] is expected to not be present on the target database 138 (i.e., is not a discrepancy) because [PK2] was deleted from the source database 134 prior to T2 and thus appropriately does not appear on the target database 138. As [PK8] was inserted after T2, it is not applicable to the first set of parity results. In contrast, the parity module 170 will determine that the value associated with [PK5] incorrectly maintained its previous value of 5, indicating a clear failure to update on the target database 138. Based on their discrepancy type, [PK1] and [PK3] represent ambiguous cases that could be "genuine errors" or "eventually consistent"—thus, for this example, the parity module 170 generates the set of ambiguities to include [PK1] and [PK3]. As further discussed by example below, the parity module 170 will ultimately determine that, although [PK1] is correctly listed with an associated value of 2 from the 1:30 pm update, the value of [PK1] is considered "stale" as there was an additional update to [PK1] after T2 (i.e., it is "eventually consistent"). In contrast, as also further described below by example, the parity module 170 will ultimately determine that [PK3] is indeed erroneously present on the target database 138, indicating a missed deletion (i.e., it is a "genuine error").

Further upon categorizing the discrepancies into the discrepancy types, the parity module 170 in conjunction with the advanced DQM algorithm 180 generates a set of updates including ones of the second set of parity results assigned the second discrepancy type. That is, the set of updates represents discrepancies associated with changes that occurred after the time of ingestion (e.g., after T2) that were flagged as data discrepancies due to data being present on the source database 134 but not being present on the target database 138 (i.e., the second discrepancy type).

Thus, for the non-limiting example above, the parity module 170 may generate the second set of parity results (i.e., returning new or altered data that appeared on the source database 134 after T2) by submitting the following simplified example SQL-based queries: [Query 4] 'DL_Changes_2=Select*from DL_table where cdc_column>T2', which will retrieve all records from DL_table (on the target database 138) where the values in the cdc_column fall after T2, i.e., all inserts and updates on the target database 138 after T2 (which will be an empty set); [Query 5] 'Source_Changes_2=Select*from Source_table where cdc_column>T2', which will retrieve all records from Source_table (on the source database 134) where the values in the cdc_column fall after T2, i.e., all inserts and updates on the source database 134 after T2; and [Query 6] 'Compute {Source_Changes_2-DL_Changes_2}', which will return a difference between the results of Query 4 and Query 5, i.e., the second set of parity results. In some instances, the parity module 170 may entirely refrain from submitting Queries 4 and 6, as there is no data greater than T2 on the target database 138 for this example. Thus, the parity module 170 may categorize the discrepancies identified from the second set of parity results as follows: [First Discrepancy Type]: {Empty}; [Second Discrepancy Type]: {[PK1], [PK8]}; and [Third Discrepancy Type]: {Empty}.

To note, for this example, since the final update to [PK1] occurred at 2:20 pm (i.e., after T2), the discrepancy identified in the first set of parity results is resolved by the time the second set of parity results is generated (i.e., it is "eventually consistent"), as shown above. Similarly, since [PK8] was inserted at 2:30 pm (i.e., after T2), although no discrepancy was identified for [PK8] in the first set of parity results, the issue is similarly resolved by the time the second set of parity results is generated. Thus, for this example, the parity module 170 generates the set of updates to include [PK1] and [PK8]. In contrast, the discrepancies that were identified for [PK3] and [PK5] in the first set of parity results are not resolved by the time the second set of parity results are generated because they are "genuine errors" based on changes that occurred prior to T2. Thus, [PK3] and [PK5] are not included in the set of updates.

Upon generating the set of ambiguities and the set of updates, the parity module 170 in conjunction with the advanced DQM algorithm 180 generates differential results. Specifically, the differential results are generated based on an intersection of the set of ambiguities and the set of updates. In other words, the differential results distinguish between data discrepancies that appear in both sets of parity results from those that do not. In some implementations, a first subset of changes associated with parity results appearing within the set of ambiguities and the set of updates represents "eventually consistent" data discrepancies, and a second subset of changes associated with parity results appearing within the set of ambiguities and not within the set of updates represents "genuine error" data discrepancies.

For the non-limiting example above, the parity module 170 generates the differential results by determining a difference between the set of ambiguities (i.e., [PK1] and [PK3]) and the set of updates (i.e., [PK1] and [PK8]). For instance, the parity module 170 may determine an intersection of the set of ambiguities and the set of updates, which for this example is {([PK1], [PK3])∩([PK1], [PK8])}={[PK1]}. This result may be referred to as "the first subset of changes" or the "eventually consistent" data discrepancies. The parity module 170 may also determine a difference between the set of ambiguities and the intersection of the set of ambiguities and the set of updates, which for this example is {([PK1], [PK3])−[([PK1], [PK3])∩([PK1], [PK8])]}={([PK1], [PK3])−([PK1])}={[PK3]}. This result may be referred to as "the second subset of changes" or the "genuine error" data discrepancies.

Upon generating the first and second subsets of changes based on the differential results, the repair module 190 may be used to selectively repair ones of the changes accordingly. Specifically, the repair module 190 selectively refrains from repairing data associated with the first subset of changes (i.e., the "eventually consistent" data discrepancies), and selectively repairs data associated with the second subset of changes (i.e., the "genuine error" data discrepancies). In some implementations, the selective repairing further includes automatically repairing data associated with ones of the first set of parity results assigned the second discrepancy type or the third discrepancy type, as they are clear errors that do not require being grouped into the set of ambiguities or the set of changes. In other words, in such implementations, the repair module 190 automatically repairs ones of the data discrepancies (e.g., without further processing) based on changes occurring before the time of ingestion that were flagged as data discrepancies due to not being present on the source database 134 but being present on the target database 138 or due to being present on the source database 134 and the target database 138 but differing.

For the non-limiting example above, the repair module 190 refrains from making changes to [PK1] (i.e., an "eventually consistent" data discrepancy) on the target database 138, thus saving processing power and avoiding further errors, allowing [PK1] to be automatically updated during the next ingestion process. In contrast, since [PK3] has been designated as a "genuine error" data discrepancy, the repair module 190 will repair [PK3] by deleting its record from the target database 138. As mentioned above, the repair module 190 may automatically repair discrepancies designated as clear errors, such as the discrepancy associated with [PK5].

The ingestion adapter 140, the event bus 150, the materializer 160, the parity module 170, the advanced DQM algorithm 180, and/or the repair module 190 are implemented in software, hardware, or a combination thereof. In some implementations, any one or more of the ingestion adapter 140, the event bus 150, the materializer 160, the parity module 170, the advanced DQM algorithm 180, or the repair module 190 is embodied in instructions that, when executed by the processor 110, cause the system 100 to perform operations. In various implementations, the instructions of one or more of said components, the interface 120, the source database 134, and/or target database 138, are stored in the memory 114, the database 130, or a different suitable memory, and are in any suitable programming language format for execution by the system 100, such as by the processor 110. It is to be understood that the particular architecture of the system 100 shown in FIG. 1 is but one example of a variety of different architectures within which aspects of the present disclosure can be implemented. For example, in some implementations, components of the system 100 are distributed across multiple devices, included in fewer components, and so on. While the below examples related to intelligently repairing data are described with reference to the system 100, other suitable system configurations may be used.

Figure 2:
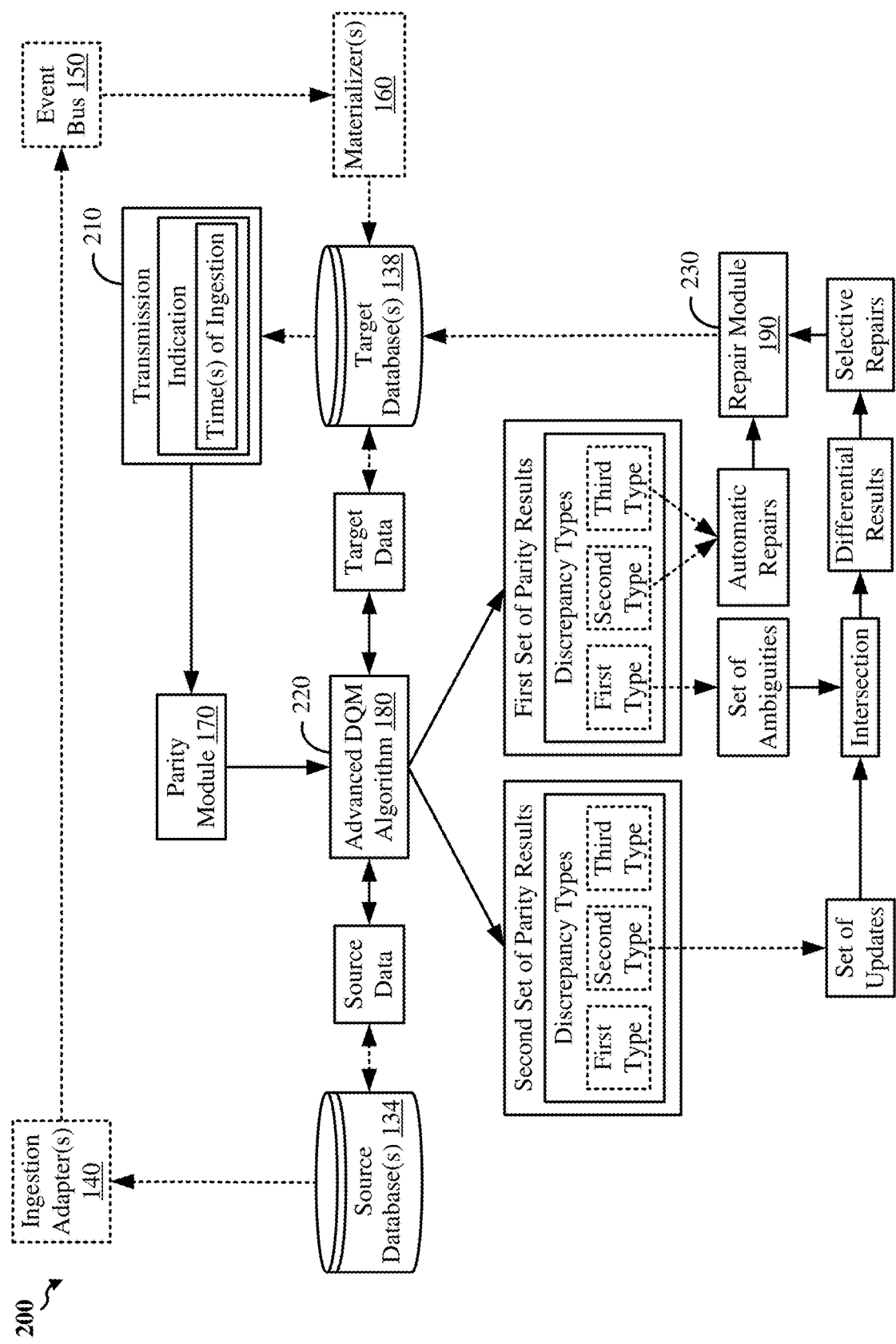
FIG. 2 shows a high-level overview of an example process flow employed by a system, according to some implementations.

FIG. 2 shows a high-level overview of an example process flow 200 employed by a system, according to some implementations, during which data is intelligently repaired. In various implementations, the system is a Data Quality Management (DQM) system and incorporates one or more (or all) aspects of the system 100. In some implementations, various aspects described with respect to FIG. 1 are not incorporated, such as the source database 134, the target database 138, the ingestion adapter 140, the event bus 150, and/or the materializer 160.

At block 210, a transmission is received (e.g., by the parity module 170) over a communications network from a computing device associated with the DQM system. The computing device may be the target database 138 or be at least communicably coupled to the target database 138. The transmission may include an indication that source data stored in the one or more source databases 134 was ingested and stored as target data in the one or more target databases 138 at a time of ingestion. In some implementations, the source data is ingested as part of a data ingestion process for replicating source data as target data. In some aspects, the data ingestion process includes replicating data stored in the one or more source databases 134 on the one or more target databases 138 and may be performed by one or more ingestion adapters (e.g., the ingestion adapter 140), one or more event buses (e.g., the event bus 150), and one or more materializers (e.g., the materializer 160), all of which components may or may not be included in the DQM system. In some instances, the one or more source databases 134 include at least one Online Transaction Processing (OLTP) database. In some other instances, the one or more target databases 138 include at least one DataLake.

At block 220, the target data is compared (e.g., by the parity module 170) with the source data using an advanced DQM algorithm (e.g., the advanced DQM algorithm 180). The advanced DQM algorithm may include generating a first set of parity results based on changes occurring before the time of ingestion, generating a second set of parity results based on changes occurring after the time of ingestion, and generating differential results based on the first set of parity results and the second set of parity results. In some implementations, the changes occurring before the time of ingestion occurred after a previous time of ingestion. In some aspects, times of the changes are determined using change data capture (CDC) timestamps. In some implementations, each parity result included in the first and second sets of parity results is assigned one of a plurality of discrepancy types. In some instances, assigning a first discrepancy type indicates that data is present on the one or more source databases 134 and not present on the one or more target databases 138, assigning a second discrepancy type indicates that data is not present on the one or more source databases 134 and is present on the one or more target databases 138, and assigning a third discrepancy type indicates that data is present on the one or more source databases 134 and the one or more target databases 138 but differs. In some implementations, a set of ambiguities is generated (e.g., by the parity module 170) that includes ones of the first set of parity results assigned the first discrepancy type. In some other implementations, a set of updates is generated (e.g., by the parity module 170) that includes ones of the second set of parity results assigned the second discrepancy type. Thereafter, the differential results may be generated based on an intersection of the set of ambiguities and the set of updates.

At block 230, ones of the changes are selectively repaired (e.g., by the repair module 190) based on the differential results. In some other implementations, the selective repairing includes identifying, based on the differential results, a first subset of the changes associated with parity results appearing within the set of ambiguities and appearing within the set of updates, and refraining from repairing data associated with the first subset of changes. In some other implementations, the selective repairing includes identifying, based on the differential results, a second subset of the changes associated with parity results appearing within the set of ambiguities and not appearing within the set of updates, and repairing data associated with the second subset of changes. In some instances, the selective repairing further includes automatically repairing data associated with ones of the first set of parity results assigned the second discrepancy type or the third discrepancy type.

Figure 3:
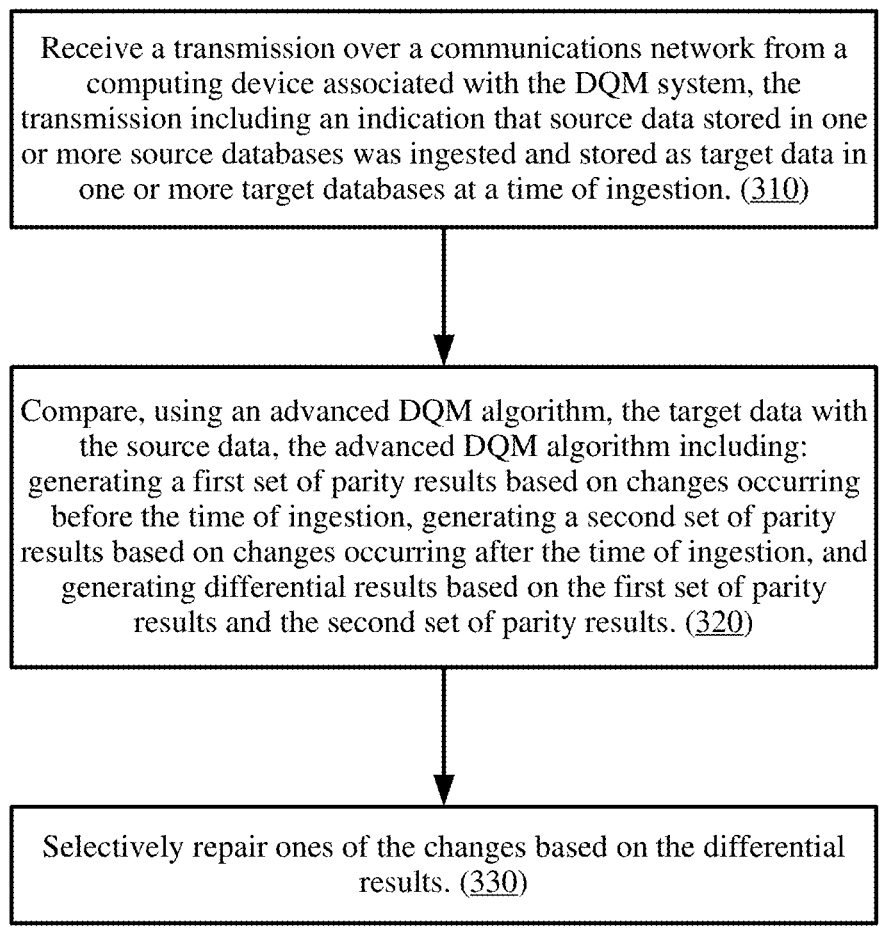
FIG. 3 shows an illustrative flowchart depicting an example operation for intelligently repairing data, according to some implementations.

FIG. 3 shows a high-level overview of an example process flow 300 employed by the system 100 of FIG. 1 and/or the system described with respect to FIGS. 2, according to some implementations, during which data is intelligently repaired. At block 310, the system 100 receives a transmission over a communications network from a computing device associated with the system, the transmission including an indication that source data stored in one or more source databases was ingested and stored as target data in one or more target databases at a time of ingestion. At block 320, the system 100 compares, using an advanced DQM algorithm, the target data with the source data, the advanced DQM algorithm including generating a first set of parity results based on changes occurring before the time of ingestion, generating a second set of parity results based on changes occurring after the time of ingestion, and generating differential results based on the first set of parity results and the second set of parity results. At block 330, the system 100 selectively repairs ones of the changes based on the differential results.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other suitable configuration. In some implementations, particular processes and methods are performed by circuitry specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification can also be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or in the alternative, a depicted operation may be split into multiple operations, or multiple operations that are depicted may be combined into a single operation. Thus, the claims are not intended to be limited to the implementations shown herein but are to be accorded the widest scope consistent with this disclosure and the principles and novel features disclosed herein.

What is claimed is:

1. A method for intelligently repairing data, the method performed by one or more processors of a data quality management (DQM) system and comprising:

receiving a transmission over a communications network from a computing device associated with the DQM system, the transmission including an indication that source data stored in one or more source databases was ingested and stored as target data in one or more target databases at a time of ingestion;

comparing, using an advanced DQM algorithm, the target data with the source data, the advanced DQM algorithm including:

generating a first set of parity results based on changes occurring before the time of ingestion, generating a second set of parity results based on changes occurring after the time of ingestion, and generating differential results based on the first set of parity results and the second set of parity results; and selectively repairing ones of the changes based on the differential results.

2. The method of claim 1, wherein:

the source data is ingested as part of a data ingestion process for replicating data stored in the one or more source databases on the one or more target databases, the one or more source databases include at least one Online Transaction Processing (OLTP) database, and the one or more target databases include at least one DataLake.

3. The method of claim 1, wherein the changes occurring before the time of ingestion occurred after a previous time of ingestion.

4. The method of claim 3, wherein times of the changes are determined using change data capture (CDC) timestamps.

5. The method of claim 1, wherein each parity result included in the first and second sets of parity results is assigned one of a plurality of discrepancy types.

6. The method of claim 5, wherein:

assigning a first discrepancy type indicates that data is present on the one or more source databases and not present on the one or more target databases, assigning a second discrepancy type indicates that data is not present on the one or more source databases and is present on the one or more target databases, and assigning a third discrepancy type indicates that data is present on the one or more source databases and the one or more target databases but differs.

7. The method of claim 6, the method further comprising:

generating a set of ambiguities including ones of the first set of parity results assigned the first discrepancy type, and generating a set of updates including ones of the second set of parity results assigned the second discrepancy type.

8. The method of claim 7, wherein the differential results are generated based on an intersection of the set of ambiguities and the set of updates.

9. The method of claim 7, wherein the selective repairing includes:

identifying, based on the differential results, a first subset of the changes associated with parity results appearing within the set of ambiguities and appearing within the set of updates;

identifying, based on the differential results, a second subset of the changes associated with parity results appearing within the set of ambiguities and not appearing within the set of updates;

refraining from repairing data associated with the first subset of changes; and repairing data associated with the second subset of changes.

10. The method of claim 9, wherein the selective repairing further includes:

automatically repairing data associated with ones of the first set of parity results assigned the second discrepancy type or the third discrepancy type.

11. A system for intelligently repairing data, the system comprising:
one or more processors;
at least one memory coupled to the one or more processors and storing instructions that, when executed by the one or more processors, cause the system to perform operations including:
receiving a transmission over a communications network from a computing device associated with the system, the transmission including an indication that source data stored in one or more source databases was ingested and stored as target data in one or more target databases at a time of ingestion;
comparing, using an advanced DQM algorithm, the target data with the source data, the advanced DQM algorithm including:
generating a first set of parity results based on changes occurring before the time of ingestion,
generating a second set of parity results based on changes occurring after the time of ingestion, and
generating differential results based on the first set of parity results and the second set of parity results; and
selectively repairing ones of the changes based on the differential results.

12. The system of claim 11, wherein:
the source data is ingested as part of a data ingestion process for replicating data stored in the one or more source databases on the one or more target databases,
the one or more source databases include at least one Online Transaction Processing (OLTP) database, and
the one or more target databases include at least one DataLake.

13. The system of claim 11, wherein the changes occurring before the time of ingestion occurred after a previous time of ingestion.

14. The system of claim 13, wherein times of the changes are determined using change data capture (CDC) timestamps.

15. The system of claim 11, wherein each parity result included in the first and second sets of parity results is assigned one of a plurality of discrepancy types.

16. The system of claim 15, wherein:
assigning a first discrepancy type indicates that data is present on the one or more source databases and not present on the one or more target databases,
assigning a second discrepancy type indicates that data is not present on the one or more source databases and is present on the one or more target databases, and
assigning a third discrepancy type indicates that data is present on the one or more source databases and the one or more target databases but differs.

17. The system of claim 16, wherein execution of the instructions causes the system to perform operations further including:
generating a set of ambiguities including ones of the first set of parity results assigned the first discrepancy type, and generating a set of updates including ones of the second set of parity results assigned the second discrepancy type.

18. The system of claim 17, wherein the differential results are generated based on an intersection of the set of ambiguities and the set of updates.

19. The system of claim 17, wherein the selective repairing includes:
identifying, based on the differential results, a first subset of the changes associated with parity results appearing within the set of ambiguities and appearing within the set of updates;
identifying, based on the differential results, a second subset of the changes associated with parity results appearing within the set of ambiguities and not appearing within the set of updates;
refraining from repairing data associated with the first subset of changes; and
repairing data associated with the second subset of changes.

20. The system of claim 19, wherein the selective repairing further includes:
automatically repairing data associated with ones of the first set of parity results assigned the second discrepancy type or the third discrepancy type.

* * * * *